United States Patent [19]

Anderson et al.

[11] 4,045,670
[45] Aug. 30, 1977

[54] PORTABLE PRECISION RADIOMETER

[75] Inventors: Alan S. Anderson, Littleton; John J. Cardarelli, Malden, both of Mass.

[73] Assignee: Williamson Corporation, Concord, Mass.

[21] Appl. No.: 726,446

[22] Filed: Sept. 24, 1976

[51] Int. Cl.² .............................................. G01J 1/00
[52] U.S. Cl. .................. 250/338; 73/355 R; 250/353
[58] Field of Search .................. 250/338, 351, 353; 73/355 R

[56] References Cited

U.S. PATENT DOCUMENTS 4,005,605  2/1977  Michael .................. 73/355 R

*Primary Examiner*—Davis L. Willis
*Attorney, Agent, or Firm*—Kenway & Jenney

[57] ABSTRACT

The radiometer disclosed herein is battery operated and employs null balance electronics to obtain high precision in a hand-held instrument. A beam splitting optical system combines an image of the target with an image of an illuminated visual meter registering the temperature measured by the instrument, thereby permitting a target to be readily scanned for temperature variations.

8 Claims, 6 Drawing Figures

4,045,670

PORTABLE PRECISION RADIOMETER

BACKGROUND OF THE INVENTION

This invention relates to hand-held radiometric apparatus and more particularly to such an instrument which permits scanning of a target while providing a high degree of accuracy in non-contact temperature measurement.

While various hand-held radiometers have been offered heretofore, these instruments were typically not well adapted for accurate scanning of a target to determine temperature variations and/or profile. Accordingly, among the several objects of the present invention may be noted the provision of a hand-held, non-contact temperature-measuring radiometer which is highly accurate and which facilitates the scanning of a target to determine temperature variations and profile.

SUMMARY OF THE INVENTION

In accordance with the present invention there is provided a portable, non-contact temperature-measuring radiometer in which a visible image of a target, gathered by an objective optical system, is combined in a viewing optical system with an image of illuminated visual meter means which registers the temperature measured by the instrument. An operator holding the instrument is thereby enabled to view a target and simultaneously read its temperature.

The objective optical system includes a wavelength-sensitive beam splitter which diverts infrared radiation onto a separate path towards a detector which is responsive to infrared radiation. An optical chopper is interposed in this path for periodically preventing infrared radiation from the target from reaching the detector.

A controllable reference source illuminates the detector during periods when the infrared radiation from the target is blocked. This reference source is energized by a null balance electronic circuit responsive to the a.c. component of the signal provided by the infrared detector in a manner tending to equalize the illumination of the detector by the source and the target. This circuit also actuates the meter to register as a function of the level of energization of the reference source, this being a function also of the temperature of the target. A battery pack is provided for energizing the chopper and the null balance circuit and these components are enclosed in a lightweight portable housing suitable for facilitating hand-held operation.

BRIEF DESCRIPTION OF THE DRAWINGS

Corresponding reference characters indicate corresponding parts throughout the several views of the drawings.

DESCRIPTION OF THE PREFERRED EMBODIMENT

The optical and mechanical components of the instrument are arranged in a very compact fashion for mounting within a rectangular frame or chassis 11 which fits within and is protected by a shroud-like plastic housing. The housing comprises a sleeve-like cover 13 which covers the top of the chassis and fits around the two sides and also a bottom handle portion 15. Molded front and back covers, 16 and 18 respectively, are also provided. The housing provides both an enclosure and grip for the instrument and an aesthetically pleasing appearance, this being the subject of design patent application Ser. No. 626,130 filed in the name of Oskar Heininger.

Figure 4:
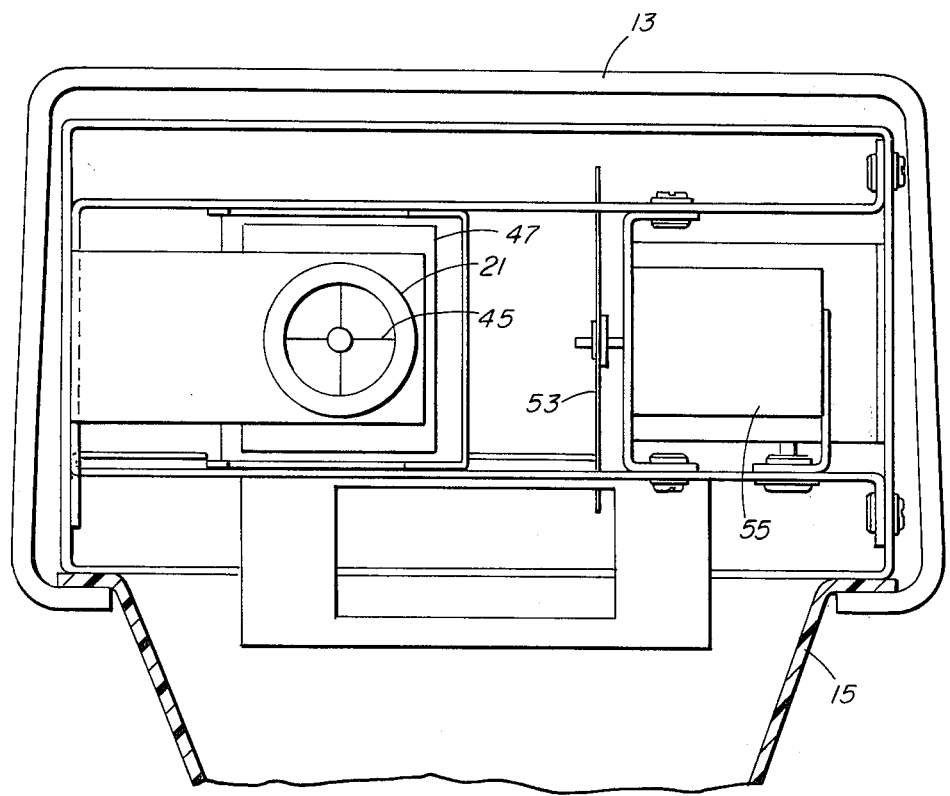
FIG. 4 is a view, taken substantially on the line 4—4 of FIG. 1, showing from the rear of the instrument the arrangement of certain components.
Figure 5:
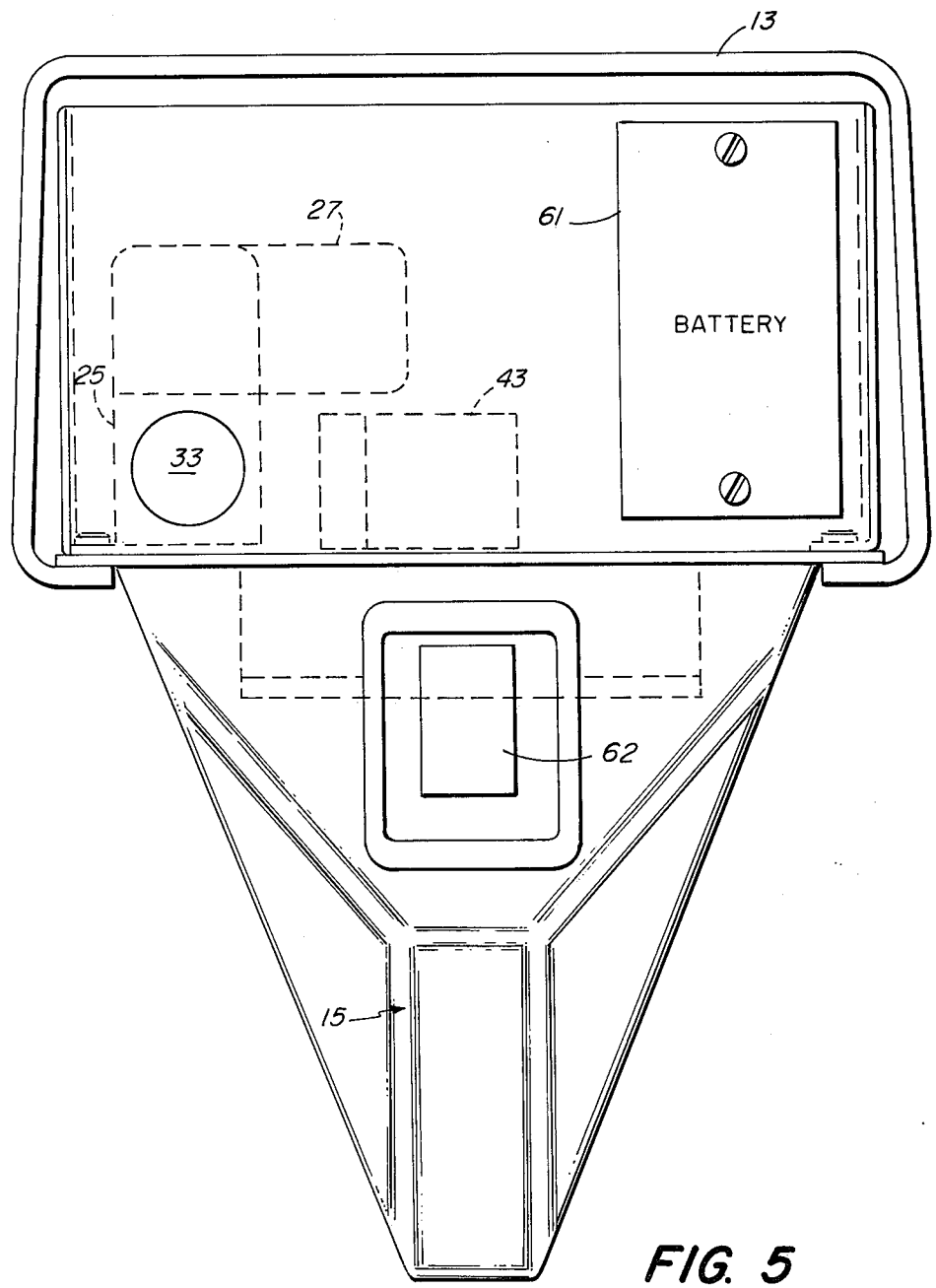
FIG. 5 is a rear view of the instrument in its enclosure.

An objective lens 19 gathers both infrared and visible radiation from a target whose temperature is to be measured. To facilitate aiming of the device, the visible light is projected, through a field lens 21, into a viewing optical system which is designated generally by reference character 23. In order to accurately define the area of the viewed target which is used as the point of temperature measurement, a reticle 45 is preferably mounted in registration with the field lens 21. In the preferred embodiment, the reticle includes an inner circle having an area which corresponds to the sensitive area of the infrared detector being used. (See FIG. 4).

Figure 3:
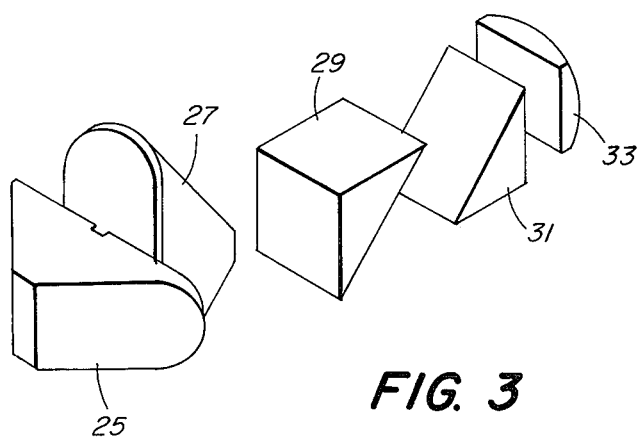
FIG. 3 is an exploded view of the elements of a viewing optical system included in the instrument of FIGS. 1 and 2.

The viewing optical system is illustrated in greater detail in FIG. 3 and comprises a pair of right angle prisms 25 and 27 combined to form a porro prism; a beam splitter formed by a pair of right angle prisms 29 and 31, one of which has a partially transmissive coating on the diagonal surface; and an eyepiece lens 33. These elements are preferably cemented together in conventional manner to form a unitary assembly which may be easily mounted within the chassis 11, i.e., by means of a bracket, as indicated at 35. As will be understood by those skilled in the art, the prisms 25 and 27 erect the image provided by the objective optics and also substantially shorten the overall physical length of the optical path so that the instrument can be kept in a package appropriate for hand-held operation.

Figure 1:
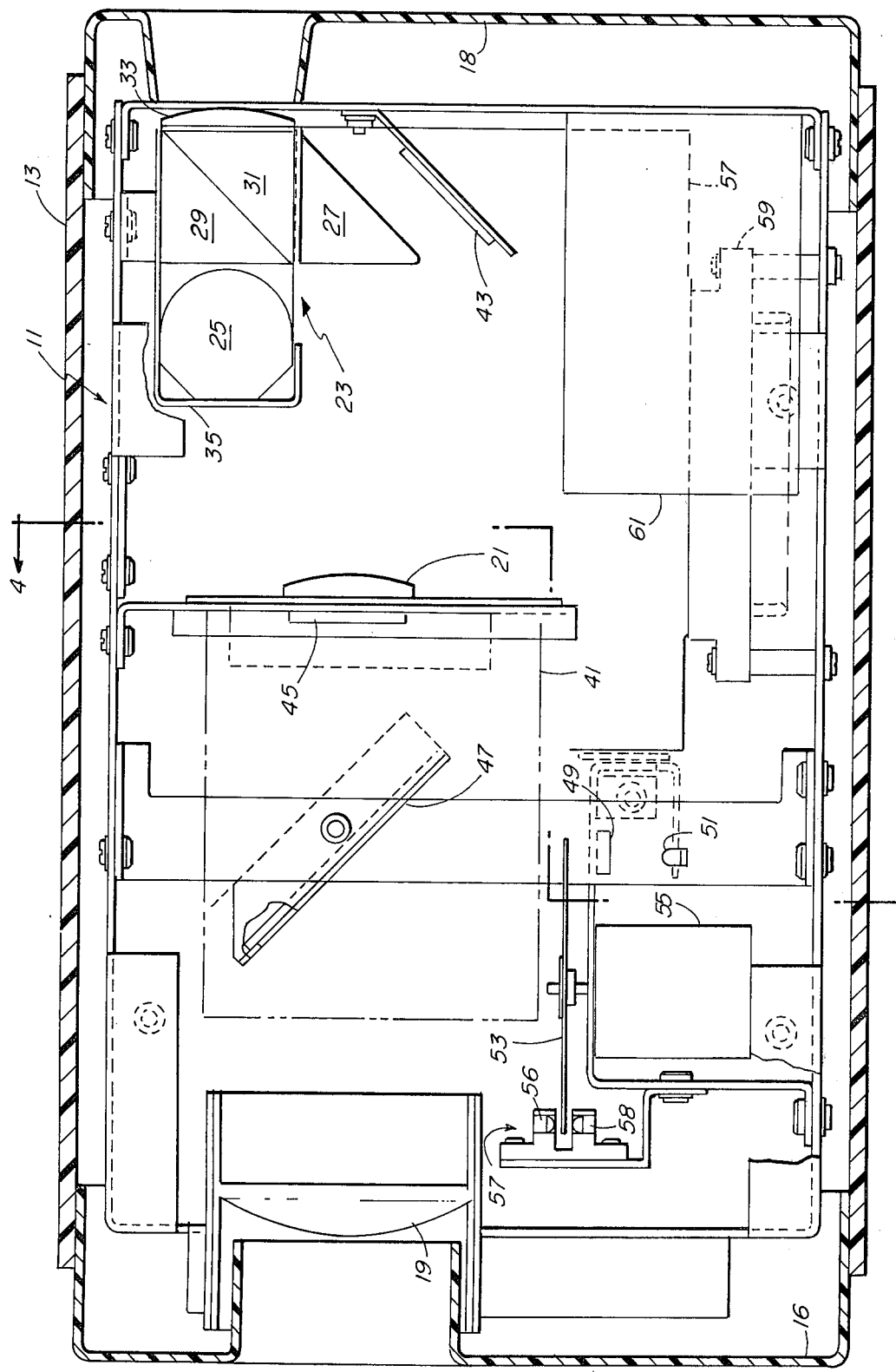
FIG. 1 is a bottom view of a radiometer in accordance with the present invention, showing the layout of the optical and electromechanical components within the instrument chassis.
Figure 2:
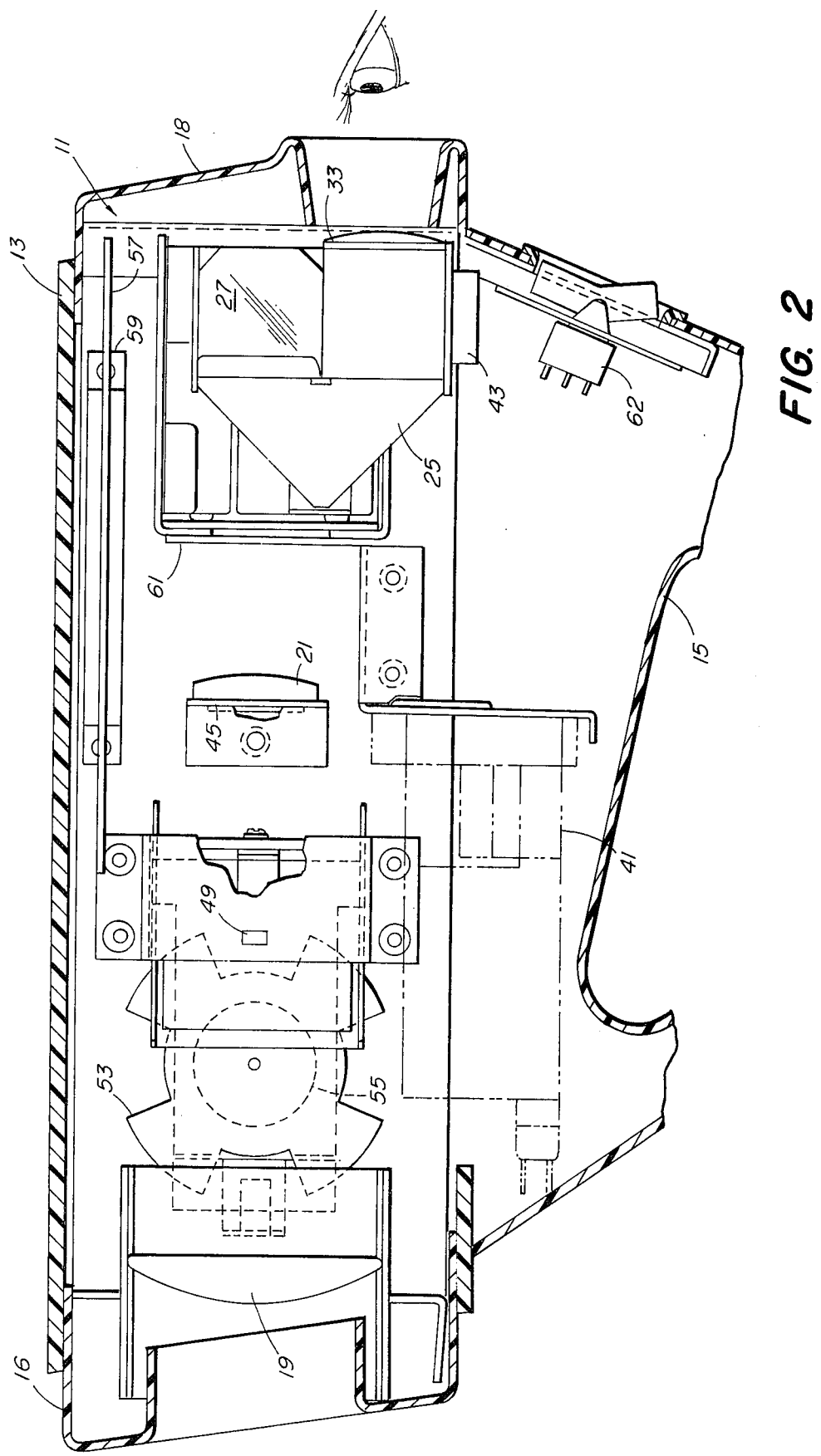
FIG. 2 is a side view, with parts broken away, of the instrument, again showing the layout of components in the chassis.

By circuitry which is described in greater detail hereinafter, the instrument actuates an illuminated visual meter for registering the temperature measured by the instrument. The illuminated visual meter may be any one of several types; a conventional moving coil analog meter which is provided with a separate source of illumination; a digital panel meter employing a liquid crystal display, also separately illuminated, or a digital panel meter of the type employing light-emitting diodes (LEDs) which are self-illuminating. In the illustrative embodiment shown, a digital meter employing LEDs is shown. A presently preferred version of such a meter is the Model 820 sold by Anadex Instruments, Inc. of Van Nuys, Calif. in that it consumes relatively little power. This meter is indicated at 41 in FIGS. 1 and 2, being mounted beneath objective optical components.

Light emitted from the meter display is directed, by an angled mirror 43, into the side axis of the beam splitter comprising prisms 29 and 31. This image is thus combined with the image of the target presented to the user of the instrument looking into the eyepiece lens 33.

Preferably, the image of the digital display is offset slightly from the image of the scene, i.e., so that the digital numbers appear just below the image of the target.

By means of a dichroic mirror 47 mounted obliquely between the objective lens 19 and the field lens 21, infrared radiation from the target is diverted away from the axis of the visual image optics and is directed towards an infrared detector 49. This detector may, for example, be of the lead salt type, e.g. lead sulfide or lead selenide. Preferably, detector 49 is of a type which is responsive from both sides so that a reference lamp, e.g. a light-emitting diode as indicated at 51 in FIG. 1, may illuminate the detector from the back side. Suitable filters may be placed over the detector 49 to render it selectively responsive to the respective radiation in each case. Infrared radiation approaching the detector 49 from the target is periodically interrupted by an optical chopper comprising a so-called butterfly disk 53 rotated by a d.c. motor 55. Motor 55 is preferably of the miniature permanent magnet type so as to minimize its current drain, only a very small amount of mechanical power being required to accelerate and drive the chopping disk 53.

In order to obtain a timing signal suitable for synchronously detecting signals obtained from the infrared detector 49, a so-called interrupter module 57 is mounted on the opposite side of the motor from the detector 49. Interrupter module 57 is conventional and employs a light-emitting diode 56 together with a light-sensitive transistor 58.

As described in greater detail hereinafter, high accuracy is obtained by utilizing a null balance mode of operation in which the reference lamp 51 is energized to illuminate the detector 49 alternately with infrared radiation from the target and its level of energization is controlled in a null balance servo loop mode so as to minimize the a.c. component of the signal generated by the detector 49. A preferred form of null balance circuitry is that shown in U. S. patent application Ser. No. 530,079 for Null Balance Radiometric Apparatus filed Dec. 6, 1974 in the name of Alan S. Anderson. This circuit is described in somewhat less detail hereinafter.

The electronic components forming the null balance circuit are mounted on a circuit board 57 which preferably lies along the top of the chassis 11 and interconnects with the various electrical components on the chassis through a plug-in edge connector 59. Set into the rear panel of the chassis 11, on the right hand side, i.e., on the side opposite the eyepiece 33, is a battery pack 61. In the embodiment shown, which is now being offered commercially, a battery pack comprising six pen-light cells is employed and will give operation for over 50 hours if rechargeable nickel cadmium cells are used. The battery pack is connected to selectively energize the motor 53 and the electronic circuitry of FIG. 6 through a manually operable switch 62 located at the rear of the handle portion of the housing. Preferably, a separate charger is provided which can be plugged into the portable unit through a suitable jack thereby allowing the cells to be recharged or to permit essentially continuous operation to be effected with the charger in place. This is particularly useful if the instrument is used alternately for process control.

Figure 6:
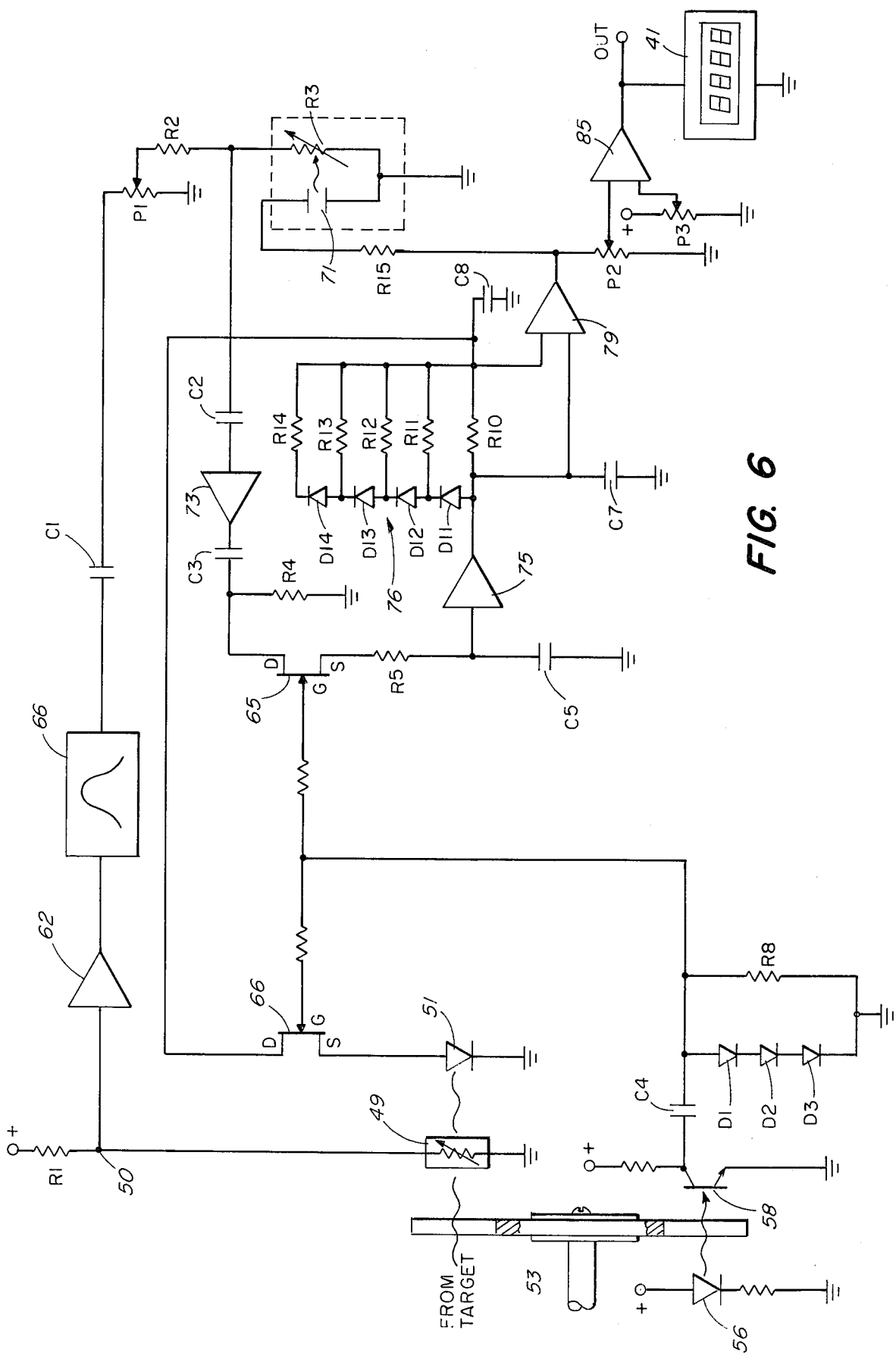
FIG. 6 is a schematic diagram of electronic null balance circuitry employed in the radiometer of FIG. 1.

With reference to FIG. 6, the signal obtained from photo-transistor 58 is a.c. coupled through a capacitor C4 to a circuit comprising three silicon diodes D1-D3 which are connected in series and are shunted by a resistor R8. This circuit clips the signal and provides a nominal d.c. level such that the resultant signal is appropriate for operating or controlling a pair of junction field-effect transistors, indicated at 65 and 66, as signal switches or gates. Suitable isolation resistors are provided as shown. The transistor 65 functions as a synchronous detector, as described in greater detail hereinafter, while the transistor 66 operates to gate the current provided to the light-emitting diode 51 so as to effect periodic energization of the diode in synchronism with the chopping of the radiation received from the target.

In addition to being de-energized when the detector 49 is exposed to target radiation, the level of energization of light-emitting diode 51 is further modulated in order to obtain a null-balance mode of operation. In the embodiment illustrated, this modulation is effected by varying the voltage supplied to the drain terminal of field-effect transistor 66. It should be understood, however, that pulse width modulation might also be used.

Referring further to FIG. 6, it can be seen that the detector 49 is connected in a voltage divider circuit with a resistance R1 across the supply voltage so as to provide, at junction 50, a signal which varies as a function of the level of radiation incident on detector 11. Unless the effective radiation levels incident during the alternate phases of chopping are equal, taking into consideration the spectral sensitivity characteristics of detector 49, it can be seen that the signal provided at junction 50 will have a substantial a.c. component at the chopping frequency.

The detector signal is applied, through a voltage follower d.c. amplifier 62 to an amplifier 66 having a controlled bandpass. This stage thus serves to minimize extraneous signals which are substantially above or below the chopping frequency. Signals in a passband centered on the chopping frequency are a.c. coupled, through a capacitor C1, to a potentiometer P1 which feeds a voltage divider circuit comprising a fixed resistor R2 in series with a cadmium sulfide photocell R3. Photocell R3 is employed as a controllably variable resistance and for this purpose is illuminated by a light-emitting diode 71. The attenuation provided by the voltage divider is thus controllable as a function of the energization of the diode 71. As explained hereinafter, this controllable attenuation functions to provide an a.g.c. (automatic gain control) function.

The signal obtained from the voltage divider is a.c. coupled, through a capacitor C2, to an amplifier 73. The a.c. signal obtained from amplifier 73 is then applied, through a capacitor C3, to the drain terminal of field-effect transistor 65. Transistor 65 is operated as a half-wave synchronous detector, the input signal which is to be demodulated being referenced to ground by a resistor R4.

The output signal from the synchronous detector, i.e., the signal obtained at the source terminal of transistor 65, is applied to a filter of integrator comprising a resistor R5 and a capacitor C5. The voltage on capacitor C5 is thus a d.c. measure or analog of the amplitude of the a.c. component of the signal obtained from detector 49. This d.c. signal is employed as a feedback signal and, after buffering through an amplifier 75, is applied through a resistor R10 and the gating transistor 66 to light-emitting diode 51. Filtering is provided on either side of resistor R10 by capacitors C7 and C8.

As will be apparent to those skilled in the art, the variation in the level of energization of the light-emitting diode 51, responsive to the feedback signal, completes a servo loop controlling the current applied to the light-emitting diode 51. The operation of this servo loop is to adjust the energization of the diode source 51 in a sense tending to minimize the a.c. component in the infrared detector signal, that is, the incident radiation provided by the source 51 is adjusted to a level equal to the incident radiation obtained from the target. An indication of this level of radiation is provided by measuring the current applied to the light-emitting diode 51.

The current applied to the diode 51 is measured by generating a voltage which is a controlled or preselected function of the current applied to diode 35. For providing this preselected transfer function, the resistor R10 is shunted by a linearizing circuit 76. Linearizing circuit 76 comprises a string of silicon diodes D11–D13 driving a succession of shunt resistances R11–R14 of graded values. The essentially fixed forward voltage drop across each diode allows the successive shunt resistances to, in effect, be picked up successively. Thus, by appropriately grading the shunt resistances, a piecewise curve fitting or linearization may be produced. As is understood, the effective level of radiation produced by the light-emitting diode 51 is not a linear function of the equivalent target temperature but, by means of this curve fitting circuit, a close approximation of output voltage with equivalent target temperature can be obtained.

The voltage developed across the linearizing circuit 76 is applied to the input terminals of a differential amplifier 79. In addition to driving the readout circuitry, the output signal from the amplifier 79 also energizes, through a resistor R15, the light-emitting diode 71 so as to complete the a.g.c. loop.

The signal from amplifier 79 is applied to a potentiometer P2 which permits a sensitivity or so-called "span" adjustment of the ultimate output indication, the voltage from the potentiometer P2 being applied to a differential amplifier 85 which drives the digital meter 41. A d.c. reference voltage is applied, by means of a potentiometer P3, to the inverting input of amplifier 85 so that an effective zero or offset adjustment of the output indication may be provided. As the sensitivity and zero reference point of meter 87 can be adjusted independently, i.e., by means of the potentiometers P2 and P3, it can thus be seen that the meter 87 can be calibrated to display any range or portion of a range of temperatures within the overall capabilities of the instrument. The output signal representing target temperature is also provided to a suitable output jack, designated 80, so that the instrument can also be used in conjunction with other, e.g. process control, equipment or a recorder.

The great advantage of the present instrument, however, is that it can be used to scan and accurately profile temperature across a target. For example, in hydrocarbon cracking furnaces, the individual tubes can be scanned to locate possibly dangerous "hot spots" such as may be caused by so-called "coking" within the tubes. Since the operator of the instrument has within his visual field of view both a definition of the portion of the target being sensed and an accurate indication of that temperature, he can readily scan the tubes and determine if any anomalies exist.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A portable, precision, non-contact temperature measuring radiometer comprising:
    illuminated visual meter means for registering the temperature measured by said instrument;
    a detector responsive to infrared radiation;
    an objective optical system for collecting both visible and infrared radiation from a target, the temperature of which is to be measured, said objective system including a wavelength sensitive beam splitter for diverting infrared radiation toward said detector on a path separate from the visible radiation;
    a viewing optical system coupled to said objective optical system and including a beam splitter for enabling an operator holding the instrument to view a target at which the instrument is directed and simultaneously read said meter means;
    an optical chopper for periodically interrupting the incidence on said detector of infrared radiation from said target;
    a controllable reference source for illuminating said detector during periods when infrared radiation from said target is blocked by said chopper;
    a null balance electronic circuit responsive to the a.c. component of the signal provided by said detector for controlling the energization of said source to equalize the illumination of said detector by said source and said target and for actuating said meter to register as a function of the energization of said source; a battery pack for energizing said chopper and said null balance circuit together with said source and said meter; and
    a lightweight portable housing for the aforesaid components.

2. A radiometer as set forth in claim 1 wherein said meter means is a digital meter having a light-emitting diode display.

3. A radiometer as set forth in claim 1 wherein said wavelength sensitive beam splitter comprises a dichroic mirror.

4. A radiometer as set forth in claim 1 wherein said viewing optical system includes a pair of right angle prisms arranged to form a porro prism for erecting an image obtained through said objective optical system in a physically short optical system.

5. A radiometer as set forth in claim 1 wherein said chopper comprises a sector disk rotated by a permanent magnet d.c. motor.

6. A radiometer as set forth in claim 1 wherein said reference source is a light-emitting diode.

7. A portable, precision, non-contact temperature measuring radiometer comprising:
    a digital meter having a light-emitting diode display for registering the temperature measured by said instrument;
    a detector responsive to infrared radiation;
    an objective optical system for collecting both visible and infrared radiation from a target, the temperature of which is to be measured, said objective system including a dichroic mirror beam splitter for diverting infrared radiation toward said detector on a path separate from the visible radiation;
    a viewing optical system coupled to said objective optical system and including a beam splitter for enabling an operator holding the instrument to view a target at which the instrument is directed and simultaneously read said meter means;

an optical chopper comprising a sector disk driven by a permanent magnet d.c. motor for periodically interrupting the incidence on said detector of infrared radiation from said target;

a controllable solid state reference light source for illuminating said detector during periods when infrared radiation from said target is blocked by said chopper;

a null balance electronic circuit responsive to the a.c. component of the signal provided by said detector for controlling the energization of said source to equalize the illumination of said detector by said source and said target and for actuating said meter to register as a function of the energization of said source;

a battery pack for energizing said motor and said null balance circuit together with said source and said meter; and a lightweight portable housing for the aforesaid components.

8. A portable, precision, non-contact temperature measuring radiometer comprising:

illuminated visual meter means for registering the temperature measured by said instrument;

a detector responsive to infrared radiation;

an objective optical system for collecting both visible and infrared radiation from a target, the temperature of which is to be measured, said objective system including a wavelength sensitive beam splitter for diverting infrared radiation toward said detector on a path separate from the visible radiation;

a viewing optical system coupled to said objective optical system and including a beam splitter for enabling an operator holding the instrument to view a target at which the instrument is directed and simultaneously read said meter means;

an optical chopper comprising a sector disk rotated by a permanent manget d.c. motor for periodically interrupting the incidence on said detector of infrared radiation from said target;

means for generating a timing signal which is synchronously related to the rotation of said chopping disk;

a light-emitting diode for illuminating said detector during periods when infrared radiation from said target is blocked by said chopper;

synchronous detector means controlled by said timing signal for demodulating any a.c. component of the signal provided by said detector element which is synchronous with said chopping thereby to obtain a feedback signal which varies as a function of the relative levels of radiation incident on said detector element during the alternate phases of chopping;

circuit means for applying said feedback signal to said light-emitting diode through a gating means which is controlled by said timing signal thereby to balance the incident radiation levels during the alternate phases of chopping and for actuating said meter to register as a function of the energization of said light-emitting diode;

a battery pack for energizing said motor and said detector and circuit means, together with said source and said meter; and a lightweight portable housing for the aforesaid components.

* * * * *